US008986102B2

(12) United States Patent
Vandaele

(10) Patent No.: US 8,986,102 B2
(45) Date of Patent: Mar. 24, 2015

(54) WAGERING GAME WITH ASCENDING FEATURES

(71) Applicant: WMS Gaming Inc., Waukegan, IL (US)

(72) Inventor: Bryan Vandaele, Cedar Falls, IA (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/788,755

(22) Filed: Mar. 7, 2013

(65) Prior Publication Data

US 2014/0179398 A1 Jun. 26, 2014

Related U.S. Application Data

(60) Provisional application No. 61/740,743, filed on Dec. 21, 2012.

(51) Int. Cl.
*A63F 13/00* (2014.01)
*G07F 17/32* (2006.01)
*G07F 17/34* (2006.01)

(52) U.S. Cl.
CPC .............. *G07F 17/326* (2013.01); *G07F 17/34* (2013.01)
USPC ................................. 463/20; 463/16; 463/25

(58) Field of Classification Search
CPC ......................................................... A63F 1/04
USPC .................................... 463/16, 20, 25, 29, 42
See application file for complete search history.

(56) References Cited

U.S. PATENT DOCUMENTS 4,198,052 A 4/1980 Gauselmann ................. 273/143
5,152,529 A 10/1992 Okada ....................... 273/143 R
5,205,555 A 4/1993 Hamano .................. 273/143 R
5,580,055 A 12/1996 Hagiwara ..................... 273/143
5,704,835 A 1/1998 Dietz, II .......................... 463/20
5,722,891 A 3/1998 Inoue ............................. 463/20
5,788,573 A 8/1998 Baerlocher et al. ............. 463/16
5,823,874 A 10/1998 Adams ............................ 463/17
5,848,932 A 12/1998 Adams .......................... 273/143
5,882,261 A 3/1999 Adams ............................ 463/20
5,931,467 A 8/1999 Kamille ........................ 273/139
5,980,384 A 11/1999 Barrie ............................. 463/16
5,984,782 A 11/1999 Inoue ............................. 463/20
6,004,207 A 12/1999 Wilson et al. ................... 463/20
6,012,982 A 1/2000 Piechowiak et al. ............ 463/16

(Continued)

FOREIGN PATENT DOCUMENTS

GB 2 097 160 A 10/1982 .............. G07F 17/34
GB 2 117 155 A 10/1983 .............. G07F 17/34

(Continued)

OTHER PUBLICATIONS

"Arrow Line" by Bally, 1971 (appearing in Bally Slot Machines, Revised 3rd Edition, Liberty Belle Books, by Marshall Fey, p. 17).

(Continued)

*Primary Examiner* — James S McClellan
(74) *Attorney, Agent, or Firm* — Nixon & Peabody LLP

(57) ABSTRACT

A gaming system includes a wagering game initiated by a wager. The wagering game further includes an ascending-feature game outcome that triggers an ascending feature in which symbols displayed in a symbol array are changed into different symbols, including higher-value symbols, that may be subsequently evaluated for winning symbol combinations.

25 Claims, 14 Drawing Sheets

(56) References Cited

U.S. PATENT DOCUMENTS

| | | | | |
|---|---|---|---|---|
| 6,047,963 | A | 4/2000 | Pierce et al. | 273/121 |
| 6,056,642 | A | 5/2000 | Bennett | 463/20 |
| 6,068,552 | A | 5/2000 | Walker et al. | 463/21 |
| 6,089,976 | A | 7/2000 | Schneider et al. | 463/16 |
| 6,089,977 | A | 7/2000 | Bennett | 463/20 |
| 6,089,978 | A | 7/2000 | Adams | 463/20 |
| 6,110,041 | A | 8/2000 | Walker et al. | 463/20 |
| 6,120,378 | A | 9/2000 | Moody et al. | 463/20 |
| 6,155,925 | A | 12/2000 | Giobbi et al. | 463/20 |
| 6,186,894 | B1 | 2/2001 | Mayeroff | 463/20 |
| 6,190,255 | B1 | 2/2001 | Thomas et al. | 463/20 |
| 6,203,429 | B1 | 3/2001 | Demar et al. | 463/20 |
| 6,227,971 | B1 | 5/2001 | Weiss | 463/20 |
| 6,251,013 | B1 | 6/2001 | Bennett | 463/13 |
| 6,254,481 | B1 | 7/2001 | Jaffe | 463/20 |
| 6,261,178 | B1 | 7/2001 | Bennett | 463/20 |
| 6,270,411 | B1 | 8/2001 | Gura et al. | 463/20 |
| 6,350,199 | B1 | 2/2002 | Williams et al. | 463/16 |
| 6,394,902 | B1 | 5/2002 | Glavich et al. | 463/20 |
| 6,413,162 | B1 | 7/2002 | Baerlocher et al. | 463/20 |
| 6,419,579 | B1 | 7/2002 | Bennett | 463/20 |
| 6,471,208 | B2 | 10/2002 | Yoseloff et al. | 273/143 R |
| 6,517,432 | B1 | 2/2003 | Jaffe | 463/16 |
| 6,544,120 | B2 | 4/2003 | Ainsworth | 463/20 |
| 6,565,433 | B1 | 5/2003 | Baerlocher et al. | 463/20 |
| 6,582,306 | B1 | 6/2003 | Kaminkow | 463/20 |
| 6,589,114 | B2 | 7/2003 | Rose | 463/20 |
| 6,605,000 | B2 | 8/2003 | Adams | 463/20 |
| 6,612,574 | B1 | 9/2003 | Cole et al. | 273/138.1 |
| 6,634,945 | B2 | 10/2003 | Glavich et al. | 463/25 |
| 6,641,477 | B1 | 11/2003 | Dietz, II | 463/20 |
| 6,749,504 | B2 | 6/2004 | Hughs-Baird | 463/20 |
| 7,654,895 | B2 * | 2/2010 | Pacey | 463/16 |
| 7,780,519 | B2 * | 8/2010 | Gomez et al. | 463/25 |
| 8,277,305 | B2 * | 10/2012 | Caputo et al. | 463/20 |
| 8,419,525 | B2 * | 4/2013 | Caputo et al. | 463/20 |
| 2002/0010017 | A1 | 1/2002 | Bennett | 463/20 |
| 2002/0068623 | A1 | 6/2002 | Gauselmann | 463/20 |
| 2002/0142825 | A1 | 10/2002 | Lark et al. | 463/16 |
| 2002/0142846 | A1 | 10/2002 | Paulsen | 463/43 |
| 2003/0022713 | A1 | 1/2003 | Jasper et al. | 463/20 |
| 2003/0027623 | A1 * | 2/2003 | Rose | 463/20 |
| 2003/0032470 | A1 | 2/2003 | Weiss et al. | 463/16 |
| 2003/0054872 | A1 | 3/2003 | Locke et al. | 463/20 |
| 2003/0064779 | A1 | 4/2003 | Suda | 463/20 |
| 2003/0064796 | A1 | 4/2003 | Glavich et al. | 463/25 |
| 2003/0064800 | A1 | 4/2003 | Jackson et al. | 463/30 |
| 2003/0069062 | A1 * | 4/2003 | Shimizu | 463/20 |
| 2003/0083121 | A1 * | 5/2003 | Cole et al. | 463/16 |
| 2003/0092480 | A1 * | 5/2003 | White et al. | 463/20 |
| 2003/0216165 | A1 | 11/2003 | Singer et al. | 463/20 |
| 2004/0051239 | A1 | 3/2004 | Seelig et al. | 273/138.1 |
| 2005/0026673 | A1 | 2/2005 | Paulsen et al. | 463/16 |
| 2005/0096113 | A1 * | 5/2005 | Gabuchian | 463/16 |
| 2005/0159208 | A1 | 7/2005 | Pacey | 463/20 |
| 2005/0197182 | A1 | 9/2005 | Duhamel | 463/22 |
| 2008/0032764 | A1 * | 2/2008 | Cannon | 463/16 |
| 2008/0081687 | A1 * | 4/2008 | Blumel | 463/20 |

FOREIGN PATENT DOCUMENTS

| | | | | |
|---|---|---|---|---|
| GB | 2 117 952 | A | 10/1983 | G07F 17/34 |
| GB | 2 130 413 | A | 5/1984 | G07F 17/34 |
| WO | WO 97/19736 | | 6/1997 | A63F 9/24 |
| WO | WO 97/27569 | | 7/1997 | G07F 17/34 |
| WO | WO 01/33478 | A1 | 5/2001 | G06F 19/00 |
| WO | WO 02/054331 | A2 | 7/2002 | G06F 19/00 |
| WO | WO 03/089084 | A1 | 10/2003 | A63F 13/00 |

OTHER PUBLICATIONS

"Double or Nothing" by Bally Distributing Company, approx. 1975 (appearing in Lemons, Cherries, and Bell-Fruit-Gum, by Richard M. Bueschel, 1995, p. 267).

"Extra Line" by Bally, 1971 (appearing in Bally Slot Machines, Revised 3rd Edition, Liberty Belle Books, by Marshall Fey, p. 23).

"Fistful of Fives" by Jubilee, pre-1994—In the "Fistful of Fives" machine by Jubilee, a player is able to insert up to five coins to play up to five win lines on the three main reels. These three reels pay the amounts shown on the front of the machine for certain combinations. For instance, three 7's pays five coins. Spaced-apart from the three main reels are two bonus reels; one displays odds such as even, ten-to-one, six-to-one, five-to-one, etc., while the second bonus reel identifies a win-line of the main reels. When a player wins on the main reels, the winning amount is multiplied by the odds shown on the first bonus reel for the win line shown on the second bonus reel. Thus, for example, "7-7-7" on the main reels, and ten-to-one on the first bonus reel pays 50 coins, if the win lines having the 7-7-7 is show on the second bonus reel. Every spin of the main reels causes a simultaneous spin of the bonus reels. No additional coins are required to participate in the increased odds associated with the bonus reels.).

"Lucky Twins Continental" by Bally, 1972 (appearing in Bally Slot Machines, Revised 3rd Edition, Liberty Belle Books, by Marshall Fey, p. 26).

"Twin Lightning" by Bally, 1972 (appearing in Bally Slot Machines, Revised 3rd Edition, Liberty Belle Books, by Marshall Fey, p. 28).

WMS Gaming Inc., "Big Bang Piggy Bankin"™, Product Sheet, (undated), 1 page, Chicago, IL.

WMS Gaming Inc., "Stroke of Luck"™, *Product Sheet*, (undated), 1 page, Chicago, IL.

WMS Gaming Inc., "Top Cat"™, *Product Sheet*, (undated), 1 page, Chicago, IL.

WMS Gaming Inc., "Winning Streak"™, Product Sheet, (undated), 1 page, Chicago, IL.

* cited by examiner

WAGERING GAME WITH ASCENDING FEATURES

CROSS-REFERENCE TO RELATED APPLICATIONS

This application claims the benefit of U.S. Provisional Patent Application 61/740,743, filed on Dec. 21, 2012, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a method and system of conducting a wagering game on a wagering game machine such that a game outcome triggers an ascending feature resulting in changes to displayed game symbols.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed is a game feature or bonus feature that is triggered by an event occurring in a "basic" game. The game feature may include any type of modification or enhancement to game play of the basic game. The triggering event is pre-selected to initiate the game feature and may be known or unknown to the player. An unknown triggering event, or "mystery trigger," may be linked to a recognizable game event, such as a winning outcome or a non-winning outcome, and may occur randomly throughout the basic game.

Game and bonus features may operate in conjunction with basic game play, may modify and/or enhance basic game play, and may be dissimilar to basic game play with regards to game mechanics, game play experience, and other characteristics. Popular game and bonus features include free spins, award multipliers, and special awards and symbols, but game and bonus features may take any form. Often, game and bonus features provide a player an opportunity to obtain more and higher-value awards than are typically achieved in basic game play, and so provide incentive to play the wagering game in which they appear.

SUMMARY OF THE INVENTION

According to one aspect of the present invention, a gaming system is configured to conduct a wagering game. The wagering game includes a game outcome that is randomly selected from a plurality of game outcomes including at least one ascending-feature outcome. The gaming system includes one or more input devices, one or more display devices, one or more processors, and one or more memory storage devices. The one or more memory storage devices store instructions that, when executed by the one or more processors, cause the gaming system to receive an input indicative of a wager initiating the wagering game, randomly select a game outcome of the plurality of game outcomes, and display at least a portion of the selected game outcome as an array of game symbols. In direct response to the selected game outcome being one of the at least one ascending-feature outcome, the instructions cause the gaming system to select a first set of game symbols from the array according to first criteria and modify the array by changing the selected first set into symbols having a higher value than the first set. Also, in direct response to the modified array resulting in at least one winning combination of symbols being displayed, the gaming system awards a player any awards associated with the at least one winning combination. In direct response to the modified array not resulting in a winning combination, the gaming system selects a second set of displayed game symbols from the modified array according to second criteria and further modifies the modified array by changing the selected second set into symbols having a higher value than the second set.

According to another embodiment of the invention, a computer-implemented method conducts a wagering game on a gaming system including one or more input devices, one or more display devices, and one or more processors. The wagering game includes randomly selecting a game outcome from a plurality of game outcomes including at least one ascending-feature outcome. The method comprises receiving, via at least one of the one or more input devices, an input indicative of a wager initiating the wagering game. The method further randomly selects, via at least one of the one or more processors, a game outcome of the plurality of game outcomes and displays, via at least one of the one or more display devices, at least a portion of the selected game outcome as an array of game symbols. In direct response to the selected game outcome being one of the at least one ascending-feature outcome, the method selects, via at least one of the one or more processors, at least one of a first set of game symbols from the array according to a first criteria and modifies the array by changing the at least one of the first set into a symbol having a higher value than the at least one symbol of the first set. Also, in direct response to the modified array resulting in at least one winning combination of symbols being displayed, the method awards a player any awards associated with the at least one winning combination. In direct response to the modified array not resulting in a winning combination, the method selects, via at least one of the one or more processors, at least one of a second set of the displayed game symbols from the modified array according to second criteria and further modifies the modified array by changing the at least one symbol of the second set into a symbol having a higher value than the at least one symbol of the second set.

According to a different aspect of the invention, a gaming system is configured to conduct a wagering game including randomly selecting a game outcome from a plurality of game outcomes. The gaming system includes one or more input devices, one or more display devices, one or more processors, and one or more memory storage devices. The one or more memory storage devices storing instructions that, when executed by at least one of the one or more processors, cause the gaming system to receive, via at least one of the one or more input devices, an input indicative of a first wager initiating the wagering game. The instructions further cause the gaming system to randomly select a game outcome of the plurality of game outcomes and display, via at least one of the one or more display devices, at least a portion of the selected game outcome as an array of game symbols. In direct response to the displayed array including a full column of wild symbols that is not the leftmost column of the array, the gaming system awards the player any awards associated with the selected game outcome, and changes the column that is left-adjacent to the full column into wild symbols for displaying in a next-subsequent game outcome. The instructions further cause the gaming system to receive, via at least one of the one or more input devices, an input indicative of a second wager. The gaming system randomly selects a next-subsequent game outcome of the plurality of game outcomes and displays, via at least one of the one or more display devices, at least a portion of the next-subsequent game outcome as a new array of game symbols including the left-adjacent column of wild symbols.

According to yet another aspect of the invention, computer-readable storage media includes executable instructions that, when executed by at least one of one or more processors, cause a gaming system including one or more input devices and one or more display devices, to perform a method comprising receiving, via at least one of the one or more input devices, an input indicative of a wager initiating a wagering game. The instructions cause the gaming system to randomly select a game outcome of a plurality of game outcomes including at least one ascending-feature outcome and display at least a portion of the selected game outcome as an array of game symbols. In direct response to the selected game outcome being one of the at least one ascending-feature outcome, the gaming system selects a first set of game symbols from the array according to first criteria and modifies the array by changing the selected first set into symbol having a higher value than the first set. In direct response to the modified array resulting in at least one winning combination of symbols being displayed, the gaming system awards a player any awards associated with the at least one winning combination. Also, in direct response to the modified array not resulting in a winning combination, the gaming system selects a second set of displayed game symbols from the modified array according to second criteria and further modifies the modified array by changing the selected second set into symbols having a higher value than the second set.

Additional aspects of the invention will be apparent to those of ordinary skill in the art in view of the detailed description of various embodiments, which is made with reference to the drawings, a brief description of which is provided below.

Figure 1:
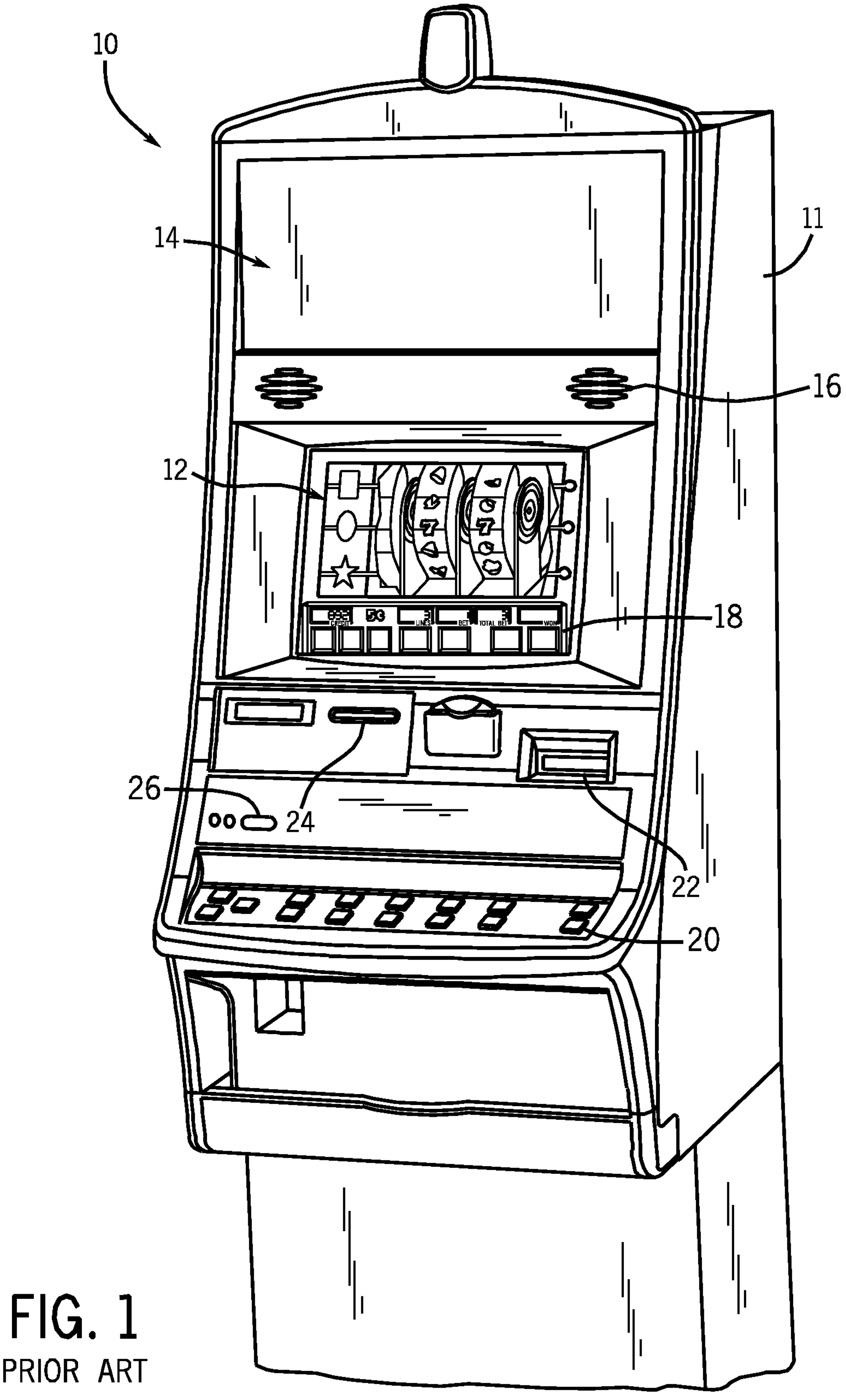
FIG. 1 PRIOR ART
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
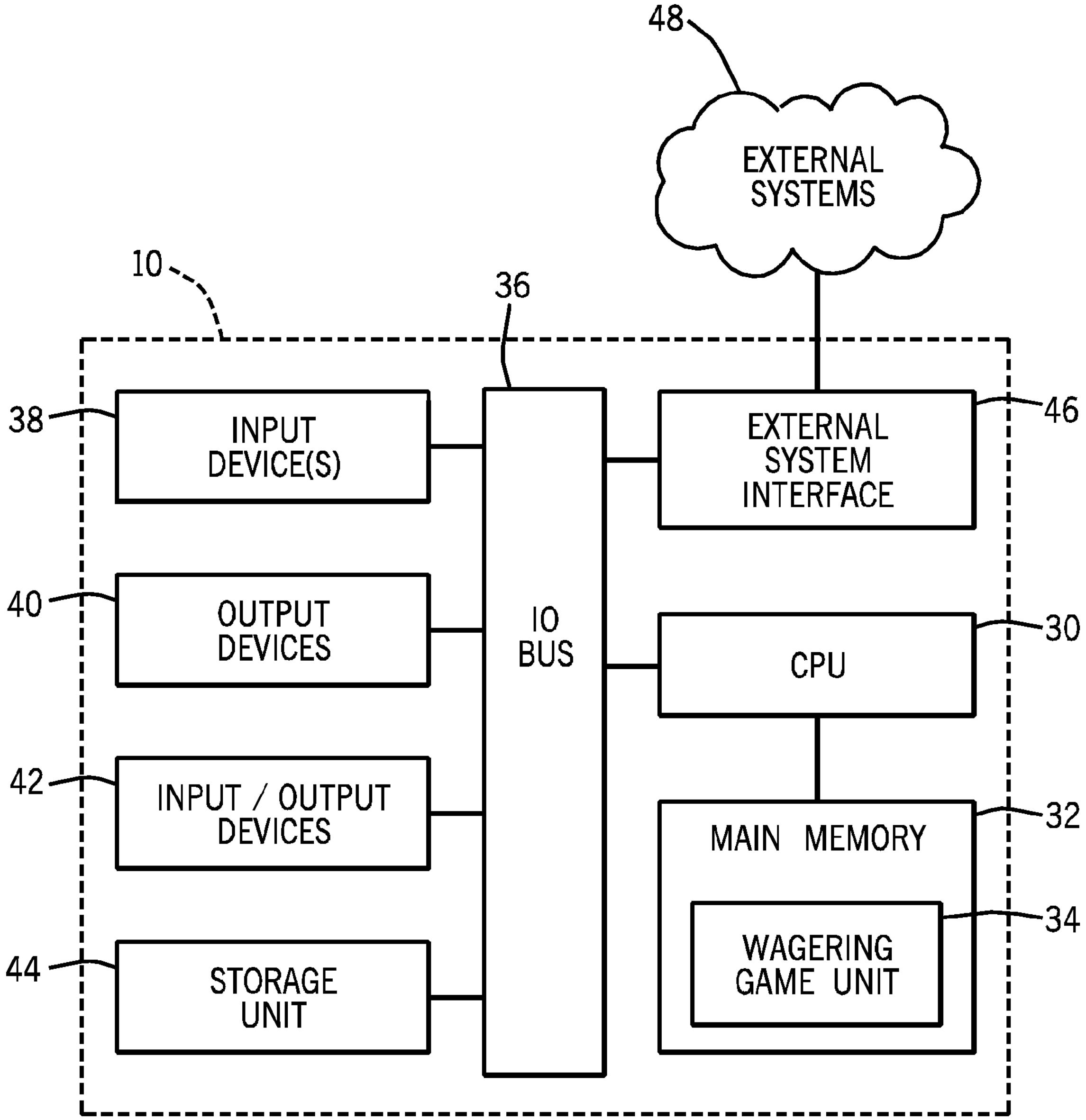
FIG. 2 PRIOR ART
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
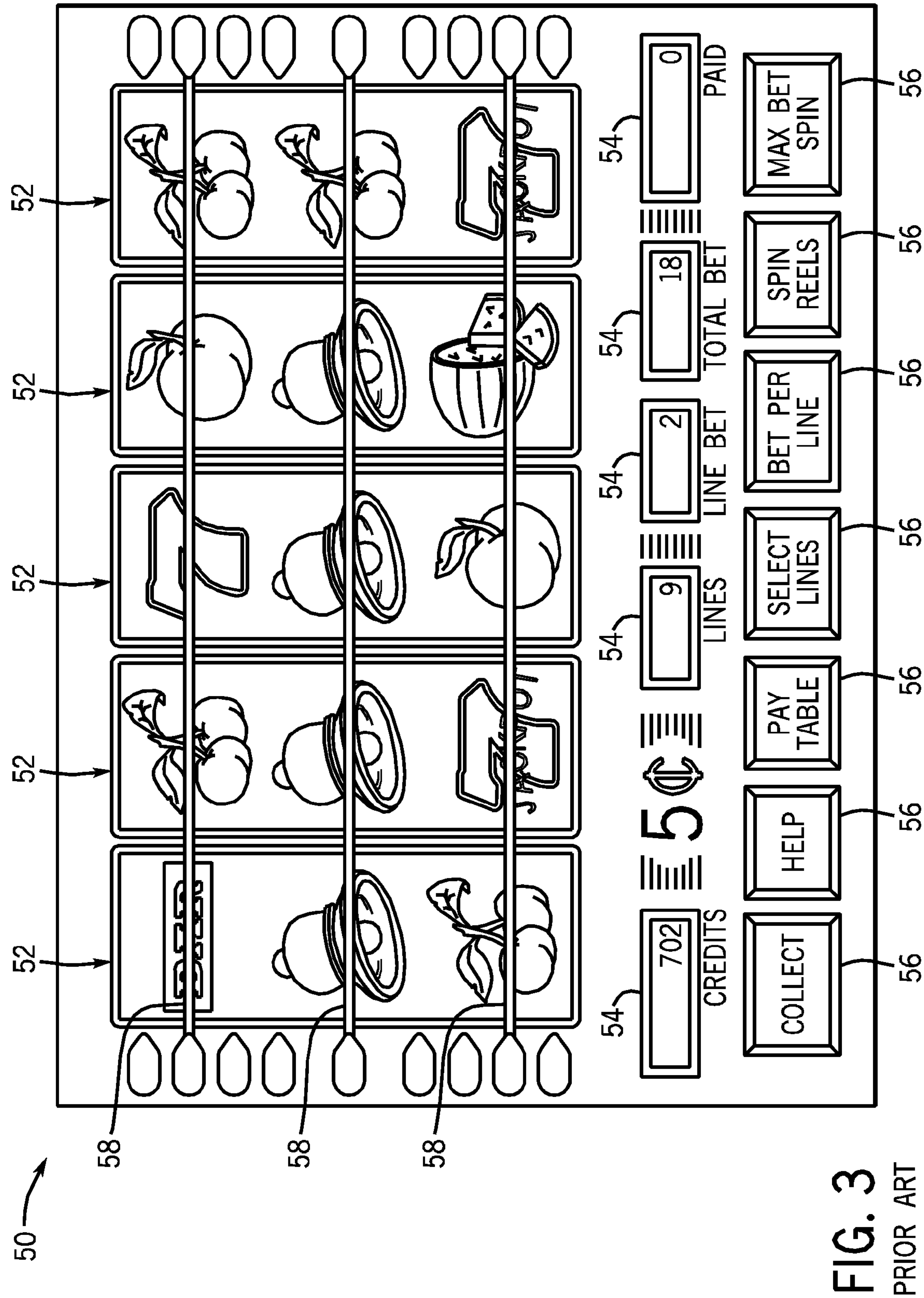
FIG. 3 PRIOR ART
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
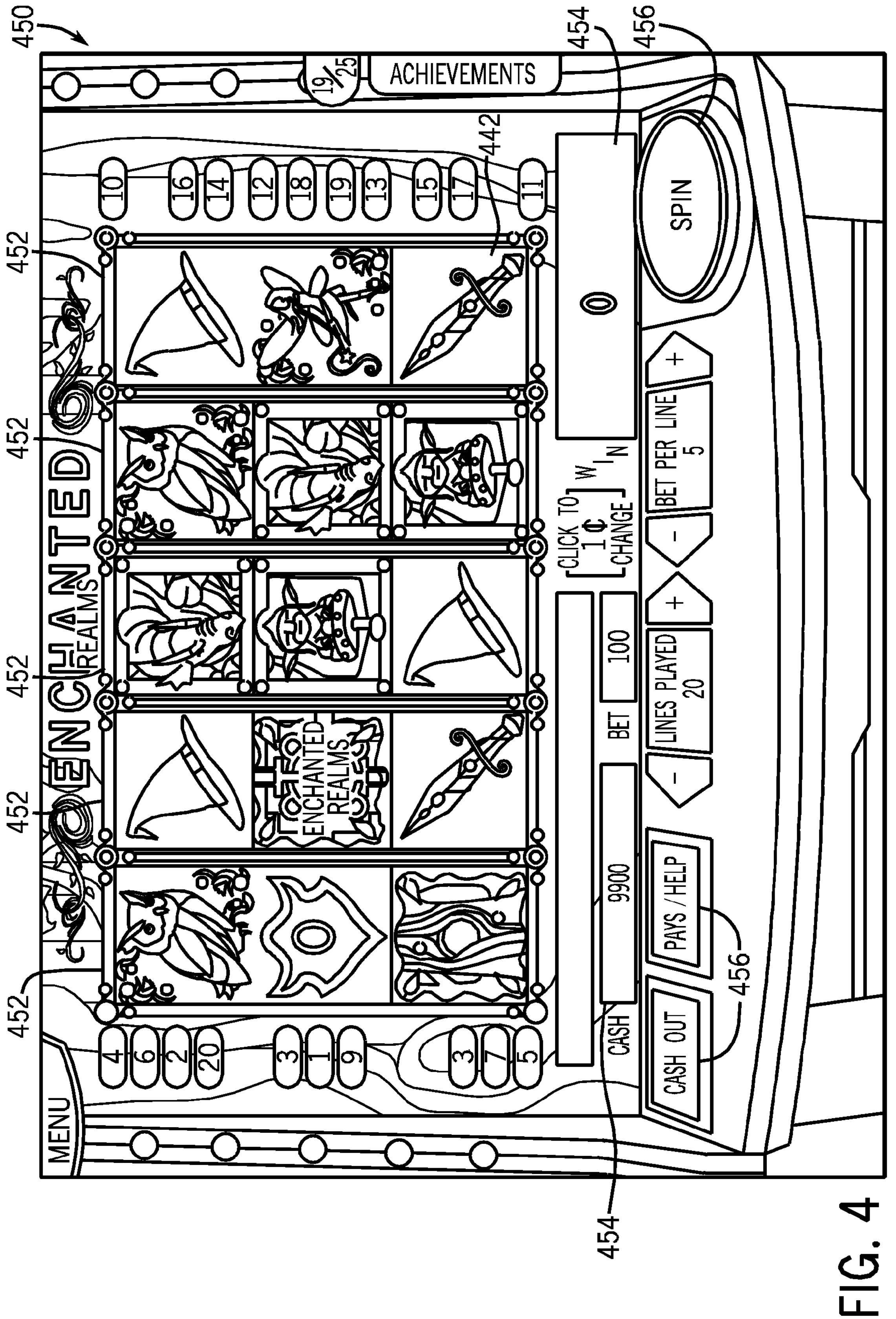
FIG. 4 presents a basic-game screen of an embodiment of the present invention.

Referring now to FIG. 4, there is shown a basic-game screen 450 showing a plurality of simulated symbol-bearing reels 452, game session credit meters 454, and touch screen buttons 456. The symbol-bearing reels 452 present an array of game symbols, such as the symbols 442, that represent the game outcome determined by game logic and based on a randomly generated number. As previously described, at least one of the one or more processors of a gaming terminal such as the gaming terminal 10 execute the game logic after receipt of an input indicating a player has made a wager to initiate the wagering game.

In an embodiment of the invention, the randomly selected game outcome includes an ascending-feature outcome, as determined by the game logic. At least a portion of the selected game outcome is displayed in the array of FIG. 4. The ascending-feature outcome of this embodiment does not include a winning symbol combination indicated on the wagering game's paytable, and does not include a symbol or symbol combination that is identified to the player as the ascending-feature outcome. Other embodiments may include an ascending-feature outcome that includes a winning symbol combination, as well as an ascending-feature outcome that is identified to the player either before, during, or after displaying the ascending-feature outcome in the array.

The occurrence of the ascending-feature outcome may automatically trigger a game feature in which a first set of game symbols is selected from the symbols displayed in the array and changed into one or more higher-value symbols.

The first set of game symbols may be selected according to first criteria included in the game logic or determined by the game logic during the course of the wagering game. In FIG. 4, the first criteria include selecting a symbol from the rightmost column 452 (column 5) of the array, and in this case the wagering game selects the dagger symbol 442 to be the only symbol in the first set of symbols.

Figure 5:
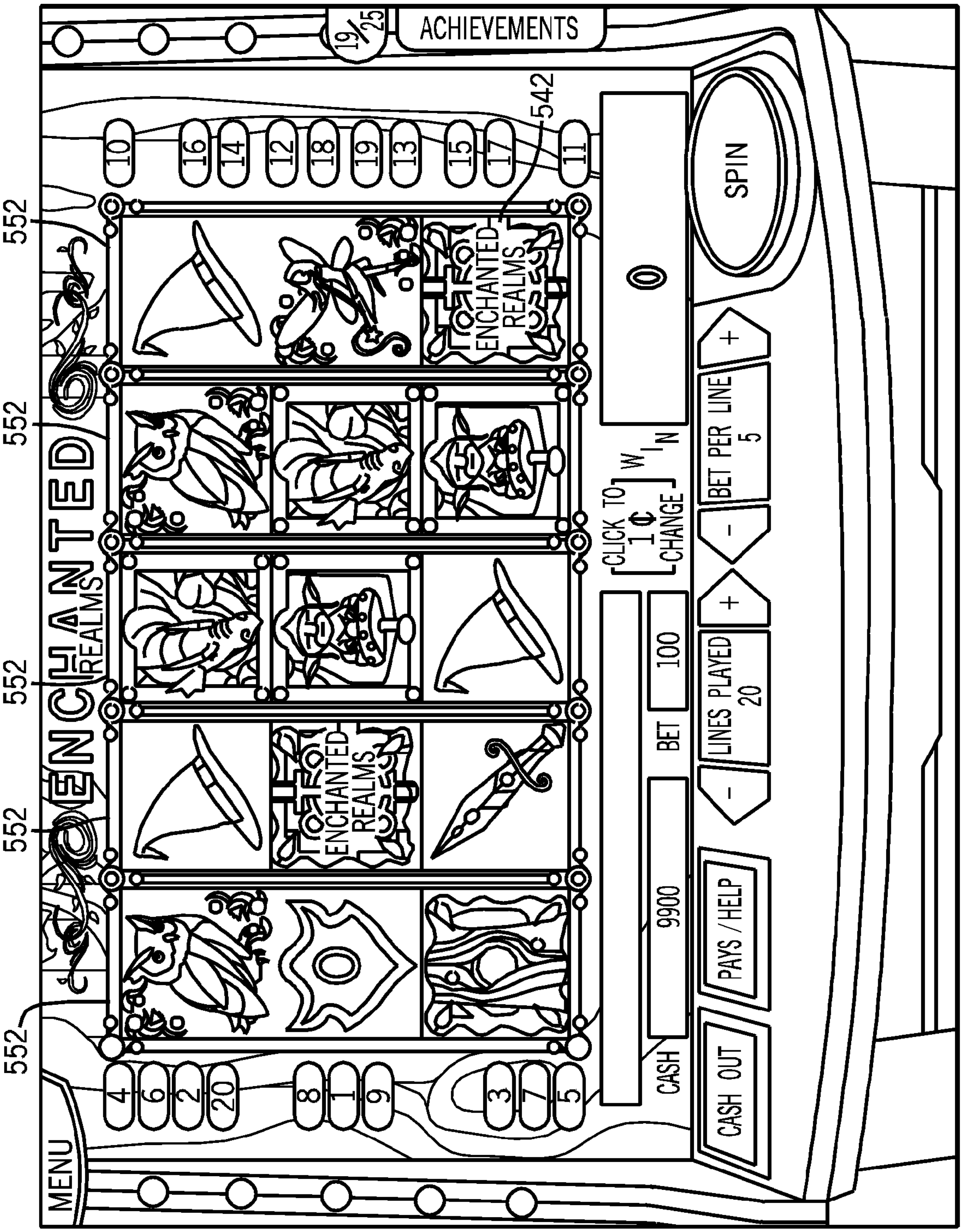
FIG. 5 presents another game screen of an embodiment of the present invention, in which a game symbol has been changed into a higher-value symbol.

Referring now to FIG. 5, the dagger symbol of the first set has been changed to a higher-value symbol (i.e., the WILD symbol 542) which may substitute for other symbols on the symbol-bearing reels 552. The array is evaluated for winning combinations resulting from the newly added WILD symbol 542 and, if the array includes a winning combination, the feature may terminate and return to the basic game.

Figure 6:
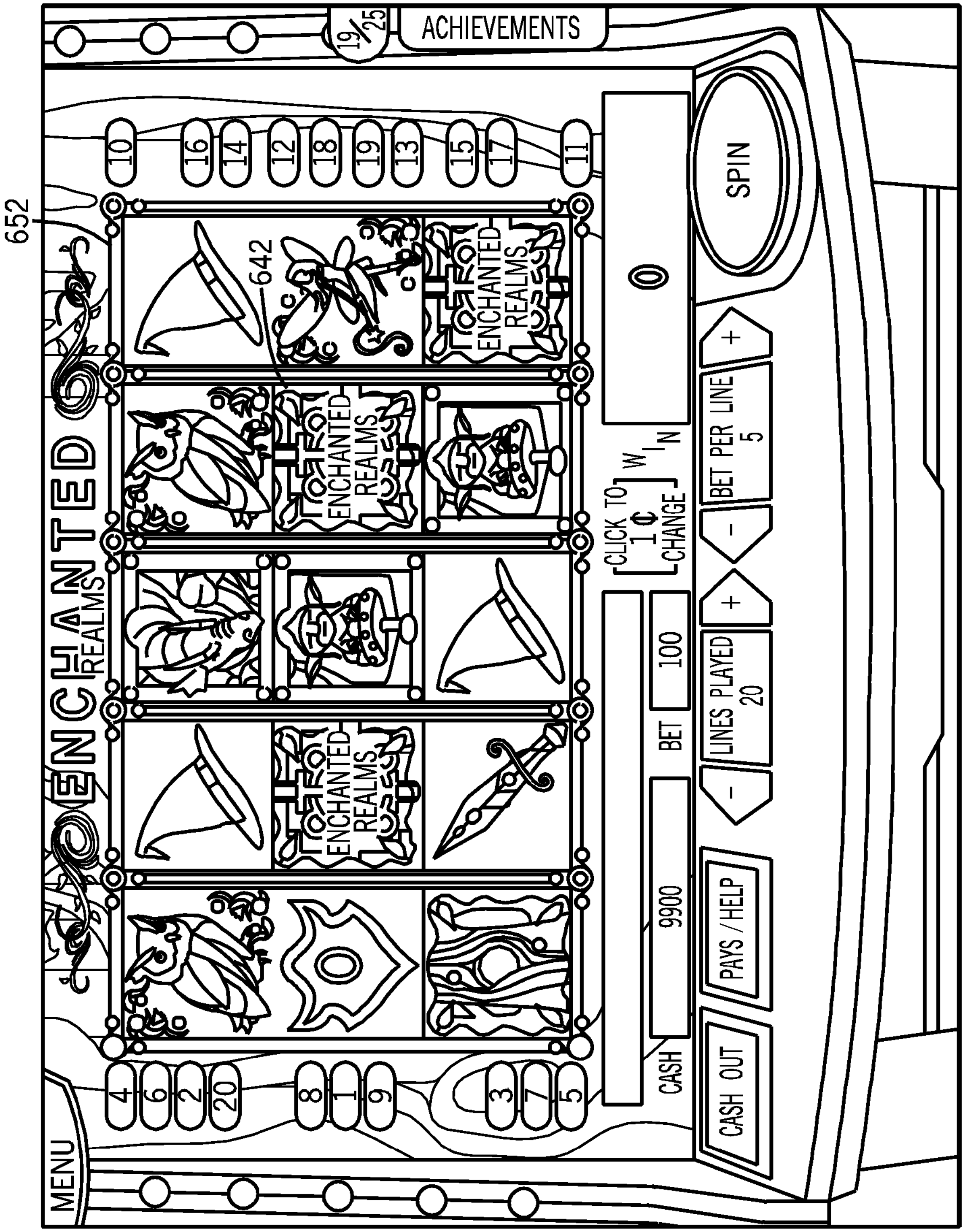
FIG. 6 presents another game screen of an embodiment of the present invention, in which a second game symbol has been changed into a higher-value symbol.

In FIG. 5, the array (including the new WILD symbol 542) does not include a winning symbol combination, and so the wagering game selects, according to second criteria, a second set of game symbols to be changed into higher-value symbols. In this case, the second criteria includes selecting a symbol from the next-to-rightmost column, and in FIG. 6 the wagering game has selected and changed the middle symbol of the column 652 (column 4) into another WILD symbol 642. The array is evaluated again for winning symbol combinations resulting from the newly added WILD symbol 642 and, once again, the array does not include a winning symbol combination.

Figure 7:
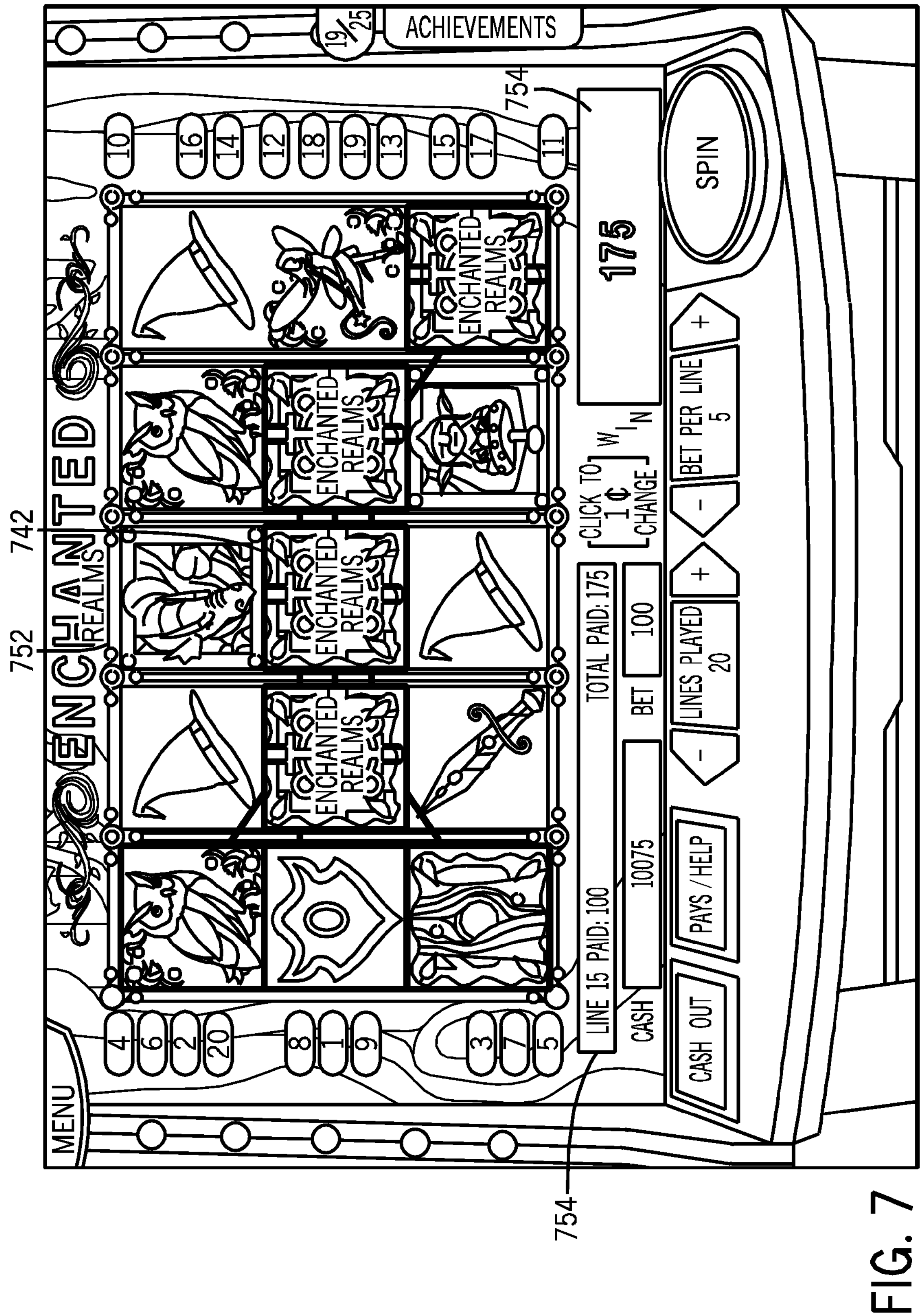
FIG. 7 presents another game screen of an embodiment of the present invention, in which three game symbols have been changed into higher-value symbols.

In the absence of a winning combination after selecting and changing the first and second sets of symbols, the wagering game may select third set of symbols according to third criteria and change the third set to a higher-value symbol. As shown in FIG. 7, the third criteria includes selecting a symbol from the column 752 (column 3) that is second from the rightmost column, and the middle symbol of column 3 has been changed to a WILD symbol 742.

With the change to the third set of symbols, the array now includes three winning combinations: a four-owl-symbol combination (owl-WILD-WILD-WILD), a five-tree-symbol combination (tree-WILD-WILD-WILD-WILD), and a four-shield-symbols (shield-WILD-WILD-WILD). The wagering game pays the paytable awards for all three combinations, for a total award of 50+25+100=175 credits and displays the award in the win and credit meters 754.

The abovedescribed sequence of selecting a set of symbols, changing the set to higher-value symbols, and displaying and evaluating the array with the higher-value symbols, may be repeated until a winning symbol combination is achieved or until one or more of various conditions are satisfied, and still remain true to the nature of the invention.

By utilizing different criteria for selecting the first and second sets, various game-play aspects may be modified so as to broaden the appeal of the invention with more players. As a non-limiting example of the different types of criteria, the wagering game may select a first set of symbols according to first criteria that includes selecting the lowest-value symbol(s) displayed in the array.

The array shown in FIG. 4 includes two dagger symbols 442, which are designated by the paytable of the wagering game to be the lowest-value symbols, and so the two dagger symbols 442 may be selected as an alternative first set of symbols.

Figure 8:
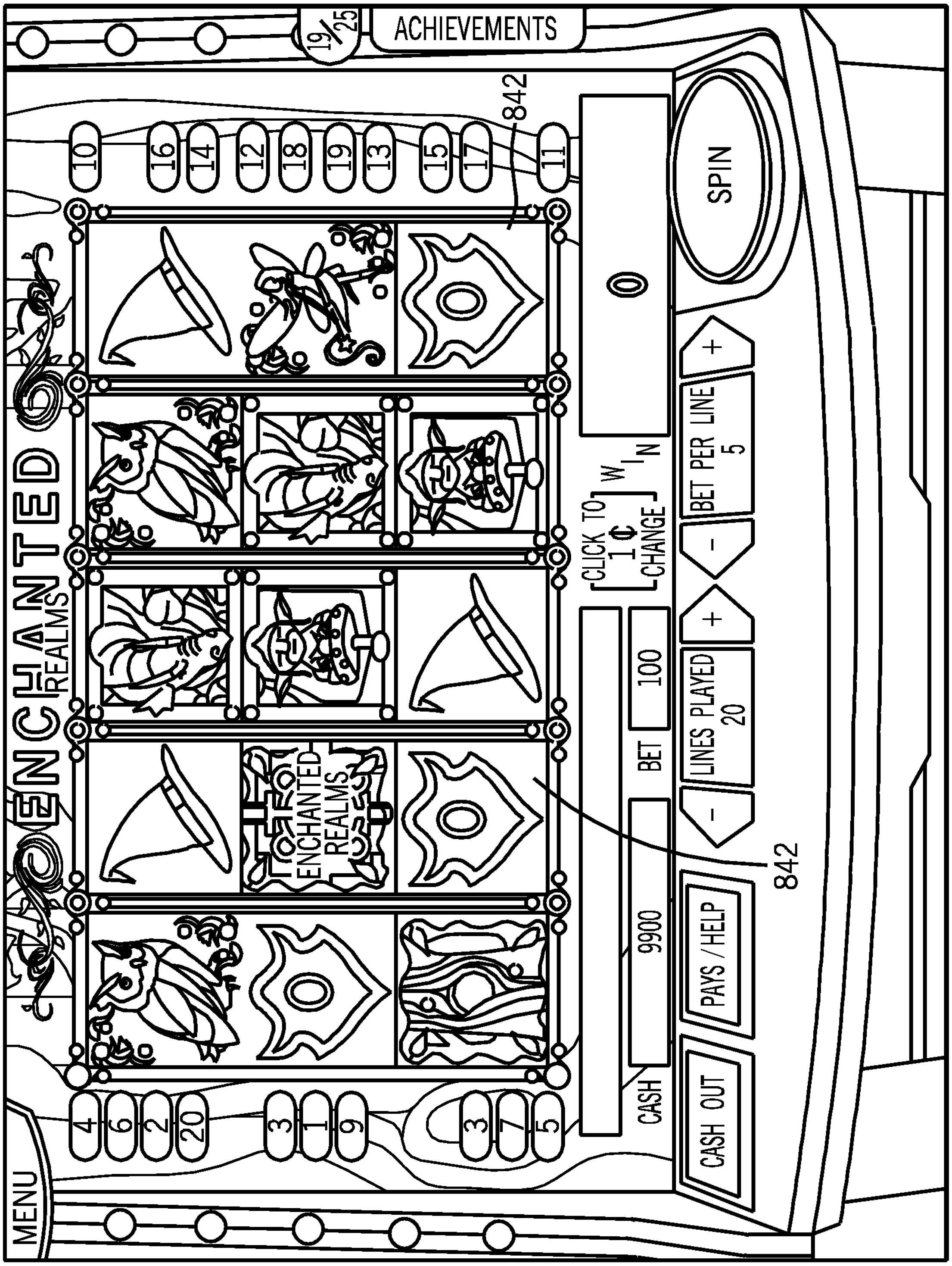
FIG. 8 presents another game screen of an embodiment of the present invention, in which two least-valuable game symbols have been changed into higher-value symbols.

As illustrated in FIG. 8, the wagering game has selected the two dagger symbols and changed them into shield symbols 842, which is the next higher-value symbol of the paytable. The array is evaluated for winning combinations resulting from the two new shield symbols 842, of which there are none. The wagering game then selects a second set of symbols according to second criteria that includes selecting all of the lowest-value symbols displayed in the array, and changes the symbols in the second set into the next-higher-value symbol.

Figure 9:
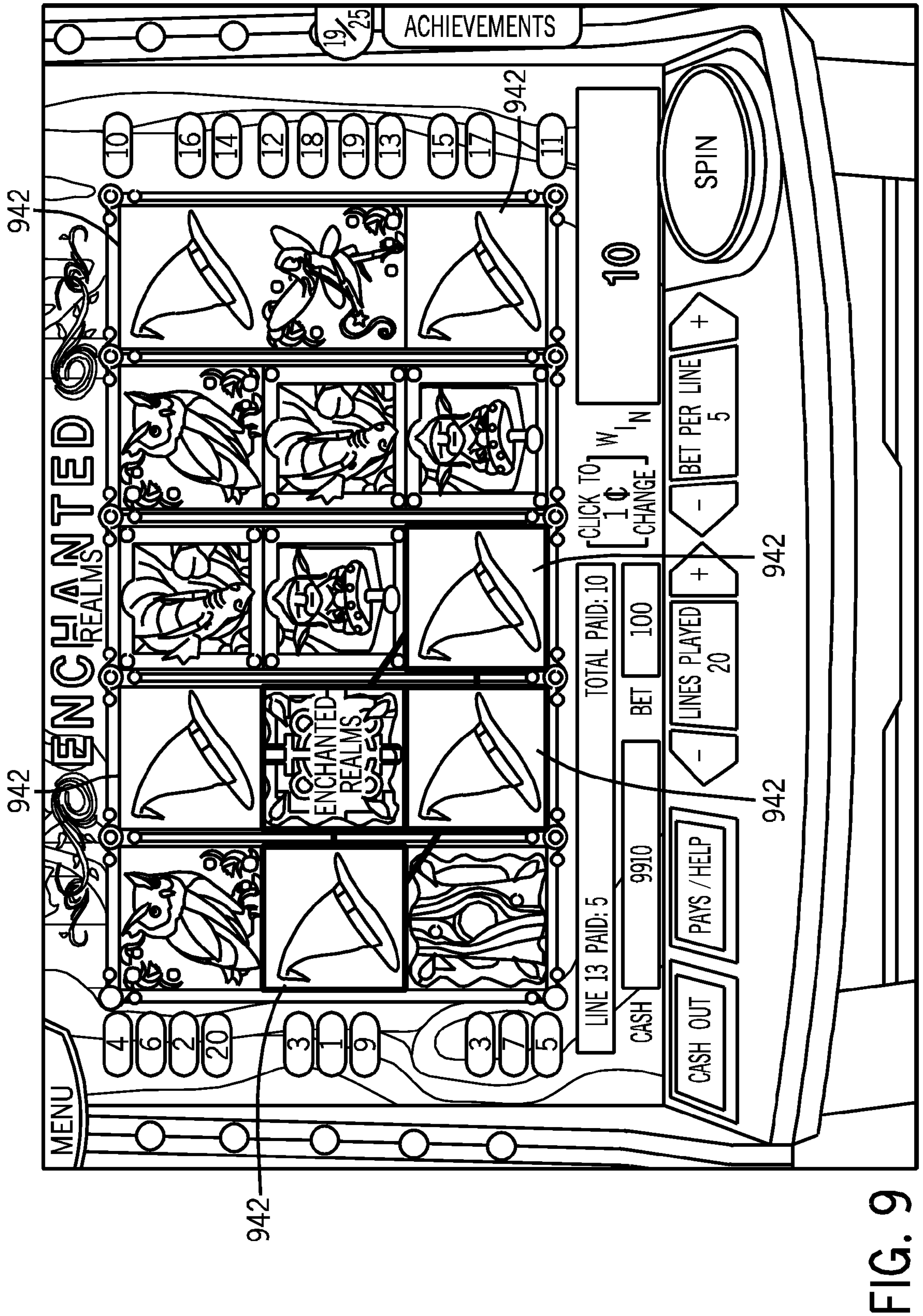
FIG. 9 presents another game screen of an embodiment of the present invention, in which more game symbols have been changed into higher-value symbols.

In FIG. 9, the wagering game has selected all the displayed shield symbols (including the newly changed first set symbols) and changed them into witch-hat symbols 942, which is the next-higher-value symbol. The array now includes two winning symbol combinations—a three-hat combination (witch hat-WILD-witch hat) and another three-hat combination (witch hat-witch hat-witch hat). The wagering game pays the paytable awards for both combinations for a total award of 5+5=10 credits and displays the award in the win and credits meters 454.

Figure 10:
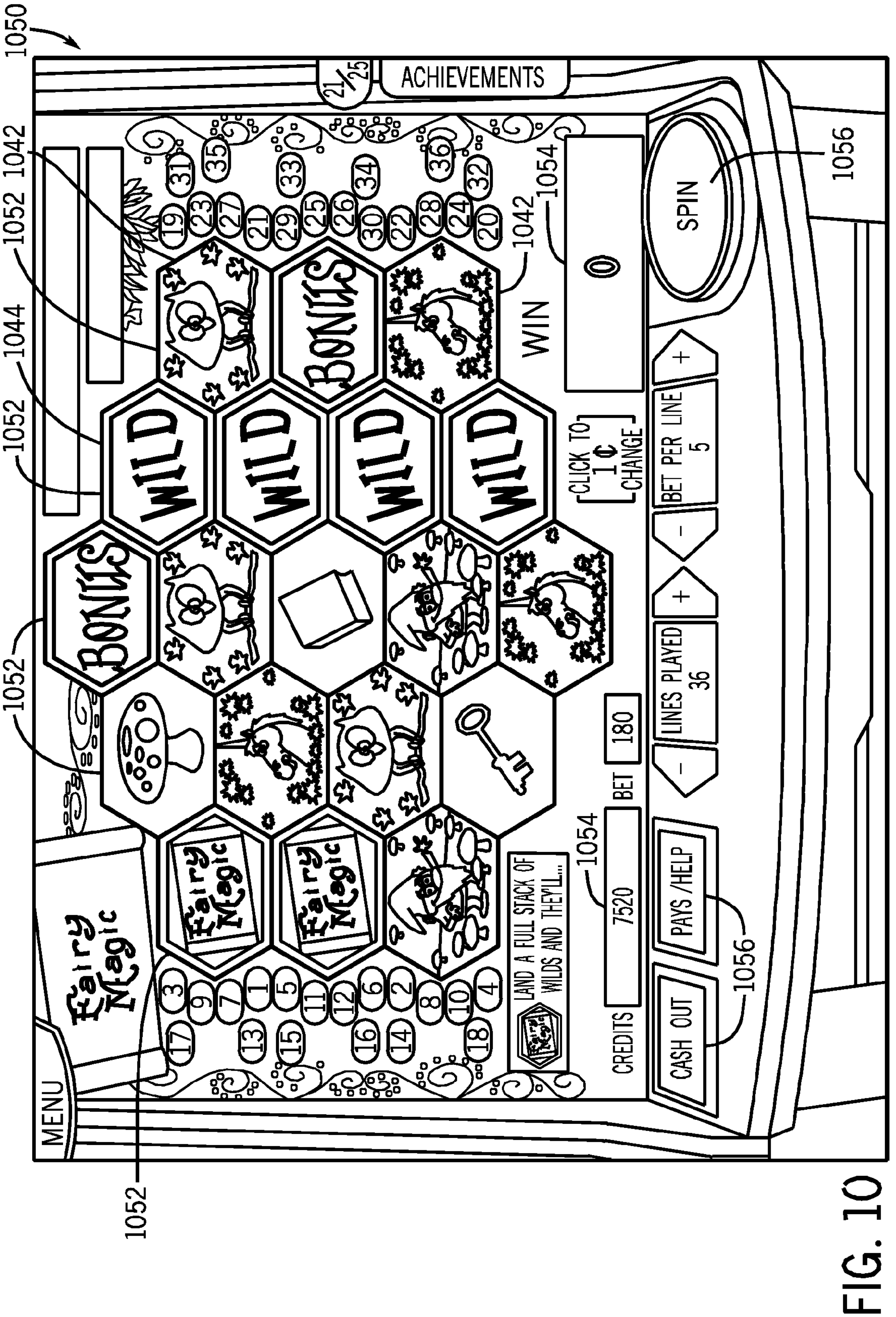
FIG. 10 is an image of a basic-game screen of an embodiment of the present invention, in which a full column of WILD symbols is displayed.

Referring now to FIG. 10, there is shown a basic-game screen 1050 of another embodiment of the invention. Basic-game screen 1050 includes a plurality of symbol-bearing reels 1052, game session credit meters 1054, and touch screen buttons 1056. The symbol bearing reels 1052 present an array of game symbols, such as the symbols 1042, that represent the game outcome determined by the game logic based on a randomly generated number.

In this embodiment of the invention, the game outcome includes an ascending-feature outcome that includes a full column of WILD symbols 1044 (column 4), as determined by game logic. In this embodiment, when a full column of WILD symbols is displayed in the array, the wagering game evaluates the array for any winning symbol combinations and pays any associated awards to the player, and then changes the column to the left of the full column of WILD symbols into a full column of WILD symbols. For the next subsequent spin, after receiving another input from the player indicating a wager, the wagering game spins the video reels to display at least a portion of a new game outcome on the display, including the new column of WILD symbols.

Figure 11:
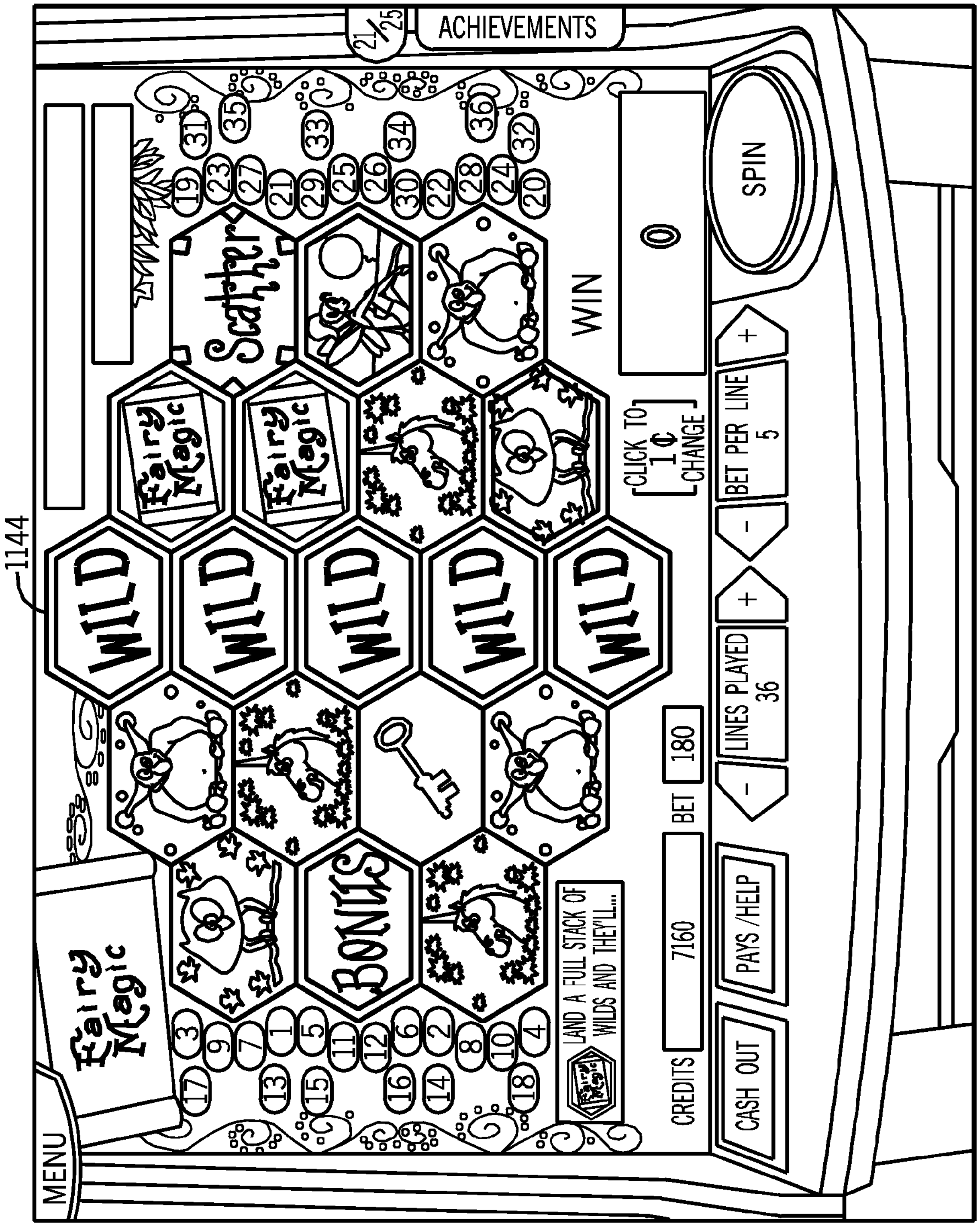
FIG. 11 presents another game screen of the embodiment of FIG. 10, in which the column left-adjacent to the previous full column of WILD symbols has been changed into a full column of WILD symbols.

As illustrated by FIG. 11, the new array includes the full column of WILD symbols 1144 in column 3. The process of changing a left-adjacent column to a full column of WILD symbols may continue with each new spin until the column of WILD symbols reaches the leftmost column of the array, at which point it exits out of the array.

Figure 12:
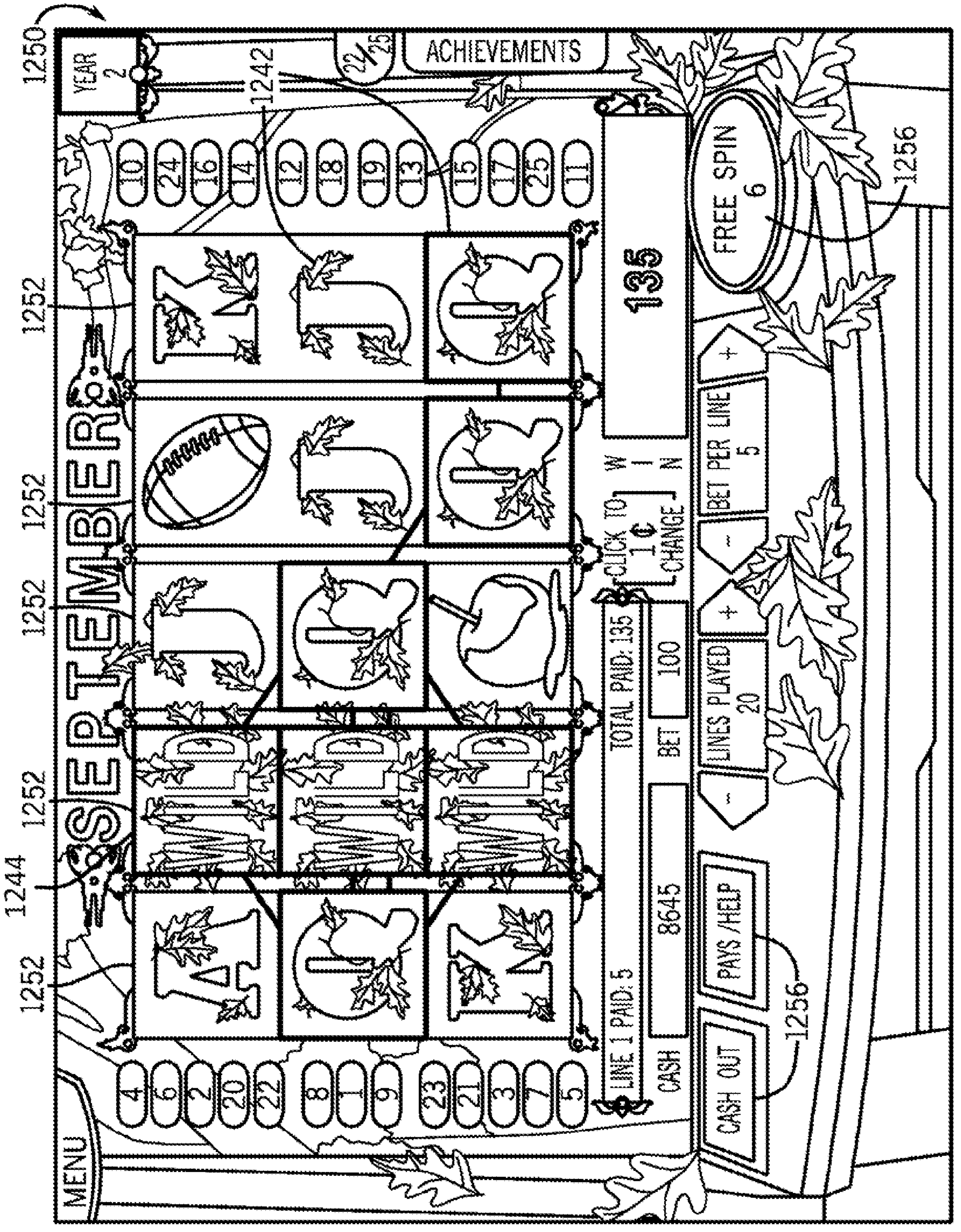
FIG. 12 is an image of a bonus-game screen of an embodiment of the present invention presents another game screen of an embodiment of the present invention, in which a full column of WILD symbols is displayed.

The invention may include various other and basic game features to provide variety and enhance player interest in the wagering game. Referring now to FIG. 12, there is shown a bonus game screen 1250 that may be part of a free-spin bonus. Of course, this embodiment may be implemented as a base game feature also. Bonus game screen 1250 includes a plurality of symbol-bearing reels 1252, game session credit meters 1254, and touch screen buttons 1256. The symbol-bearing reels 1252 present an array of game symbols, such as the symbols 1242, that represent the game outcome determined by game logic and based on a randomly generated number.

Figure 13:
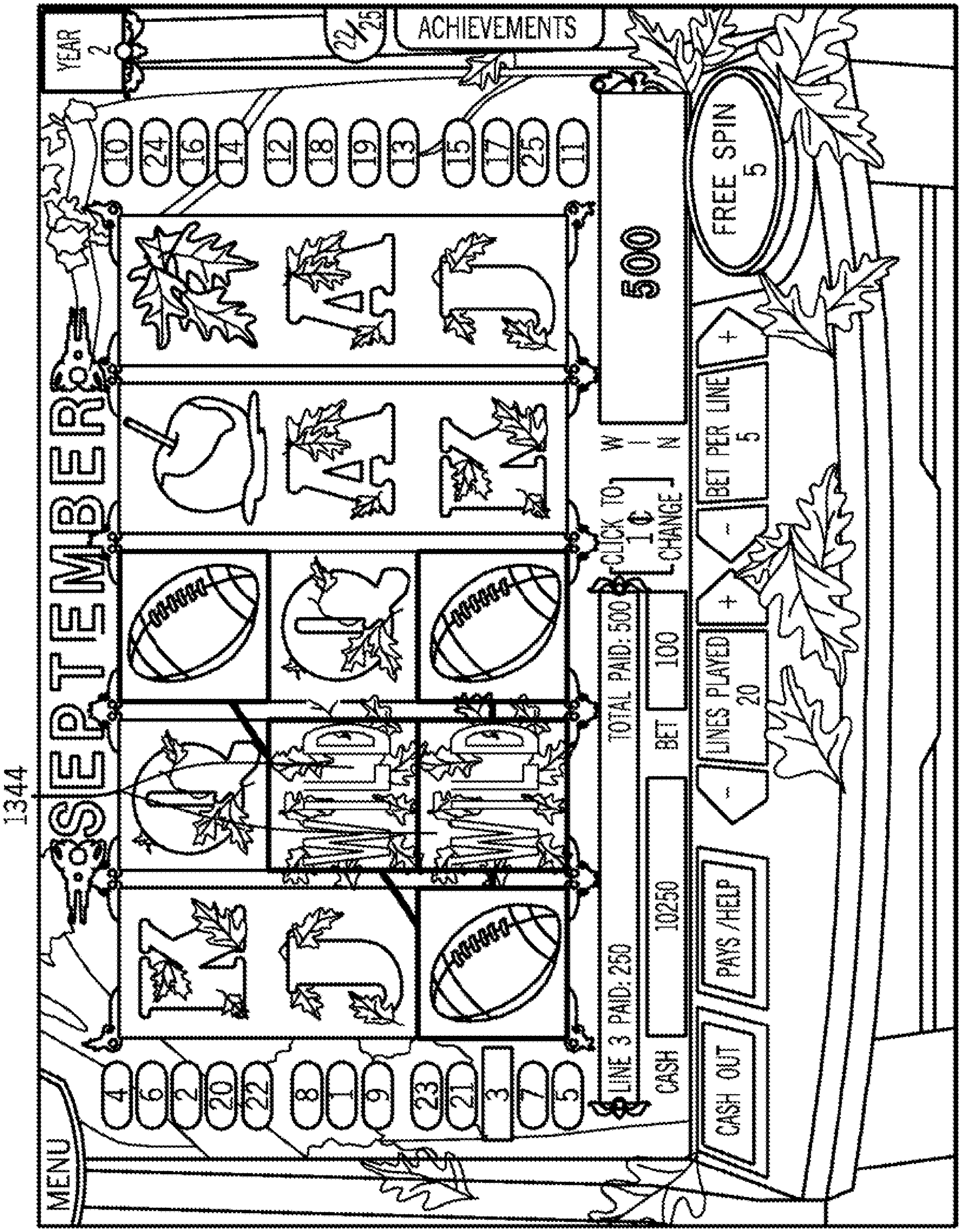
FIG. 13 presents another game screen of the embodiment of FIG. 12, in which the WILD symbols have dropped down one position in the column.

The symbol-bearing reels 1252 include a full column of WILD symbols 1244 in column 2. For the next subsequent spin (seen in FIG. 13), the WILD symbols 1344 in column 2 drop down one row while the remaining symbols of the array spin to randomly select the subsequent outcome. This sequence repeats with each subsequent spin until all the WILD symbols from the full column have dropped off the symbol array or, in some embodiments, until the free-spin bonus ends.

In some embodiments, the occurrence of another full column of WILD symbols during the free spin bonus triggers the drop-down sequence of the new full column, and in this way a player may experience a series of bonus awards as multiple columns of WILD symbols drop down incrementally in the symbol array.

Other bonus and game features may include designating a special symbol that, if it lands at the bottom, leftmost position of the array of symbols, changes to a WILD symbol that grows to encompass the bottom two positions at the left of the array. If a subsequent special symbol lands on top of the grown WILD symbols, the WILD symbols grow up to encompass another position. In at least one embodiment of a bonus feature, the WILD symbols that are grown from the special symbols will remain in the array until the bonus feature ends, for example, until a designated number of free spins are completed.

An embodiment of a game feature may designate specific reel symbols for "infecting" by WILD symbols. As a non-limiting example, a computer-themed game may include reel symbols such as Computer and Laptop symbols. When a WILD symbol occurs adjacent to either a Computer or Laptop symbol in the array, the WILD symbol infects the adjacent Computer or Laptop symbol (like a virus) and changes them into WILD symbols. Additionally, the new WILD symbols may infect adjacent Computer and Laptop symbols, and such infecting may continue until all adjacent Computer and Laptop symbols have been changed into WILD symbols. Of course, such an embodiment may be utilized in games having themes other than computer themes.

Also, a feature may include clumps of the same symbol displayed on a reel. For example, one embodiment features clumps of the same symbol appearing on the leftmost reel of the array during a bonus game. When the leftmost reel displays all matching symbols, any occurrence of the matching symbol that is displayed on other reels throughout the array may be changed into a WILD symbol. If the leftmost reel displays clumps of two different symbols, any occurrence of both symbols will change to a WILD symbol.

In another embodiment employing clumped symbols on a reel, a designated STACKED WILD symbol may occur in the array. If the STACKED WILD symbol fills an entire column, it is locked in place and triggers a bonus free spin feature. After each bonus spin, each position of the STACKED WILD column throws an additional WILD symbol into an adjacent reel, creating new WILDS on the reels to either side of the STACKED WILD column.

In yet another embodiment, if a full column of any symbol appears on the leftmost reel (i.e., reel 1) of the array, a feature may be triggered in which the full column is locked in place while the other reels begin to spin. Reel 2 stops spinning, and if any symbols on reel 2 match the symbols on reel 1, then reel 2 locks in place also. If no symbols on reel 2 match reel 1, then reel 2 spins again. Once reel 2 has stopped and locked in place, reel 3 stops spinning, and if any symbols on reel 3 match reel 1, reel 3 locks in place. The process may continue until each reel in the array has a symbol that matches reel 1. Alternatively, a WILD symbol may also be considered a match to the symbols displayed on reel 1. Once all reels in the array include at least one matching symbol, any award for winning symbol combinations displayed in the array may be awarded to a player.

A WILD symbol may salvage a "just missed" opportunity. In one embodiment, a WILD symbol on a reel may land just off the symbol array, for example, just below the bottom row. Game logic may cause the missed WILD symbol to be pulled back up to the bottom row of the array, to be evaluated with the other symbols. Additionally, a recovered WILD symbol may grow into two WILD symbols for a subsequent spin, so that, the next time it just misses the symbol array, it may be pulled back up to occupy the two bottom reel positions. A recovered WILD symbol may grow repeatedly until it occupies the entire reel in the displayed array, and then reset to a single WILD symbol.

Game themes can be utilized to complement various game features. In one embodiment, a feature is triggered when a designated trigger symbol is displayed in between two other symbols on a reel. The particular embodiment has a dinosaur theme, although the feature can be adapted to operate with various other themes and generic games. The trigger symbol is an egg and, when the egg is displayed between two dinosaurs, it "hatches" to provide an award. The award may be free spins, may turn the egg symbol (or all displayed egg symbols, or various other symbols) into a WILD symbol(s) or a full column of wild symbols, and some or all WILD symbols may persist through multiple subsequent spins. The award may be related to a characteristic of a parent dinosaur. For example, there may be three different-colored dinosaurs on the reels, and the award may vary in response to the colors of the parent dinosaurs.

In one case in which the award is responsive to the specific colors of the parents, the hatching egg triggers a free spin bonus in which the player may select from a number of eggs. Whichever color of dinosaur that hatches from the selected egg may replace all the other-colored dinosaurs on the reels for the duration of the free spins, providing the potential for more bonus awards and more valuable egg hatchings during the free spin bonus.

In another embodiment, WILD symbols may migrate around the symbol array during successive spins. For example, when a WILD symbol appears in the symbol array and is not part of a winning symbol combination, the WILD symbol may shift one position to the left and appear in that position for the next spin. Additionally, the migrating WILD may continue to shift leftward each time it is not part of a winning symbol combination until it reaches the leftmost position in the array. Still further, the migrating WILD may stay in the leftmost position through successive spins until the WILD is part of a winning symbol combination.

The invention may further include an embodiment in which symbols in a winning combination are removed from the array and the next symbol above each the removed symbol "drops" into the empty position on each reel. After the symbols drop, the array is reevaluated for winning symbol combinations, which may also be removed and replaced by dropped symbols. The reevaluations may continue as long as a new winning symbol combination is generated by dropped symbols.

In another embodiment, WILD symbols can be randomly hidden behind symbols on the reels. When a symbol is removed (due to a winning symbol combination), the WILD symbol is revealed and replaces the removed symbol in the next symbol drop. Additionally, if the next symbol drop produces a winning symbol combination, the WILD symbol may stay in position for yet another (or multiple) symbol drop(s). Still further, WILD symbols that repeat for subsequent drops may increment a multiplier for each winning symbol combination after the first drop. In one embodiment, the WILD symbols can increment up to 5× multipliers before the WILD is removed from the array. Multiple WILD symbols can be revealed and held in position during a single cycle of removals and drops. Also, if a designated number of WILDS are revealed during a cycle, all the WILD symbols can automatically jump to 5× and then decrement by 1× for each subsequent drop until they are used up and removed.

Figure 14:
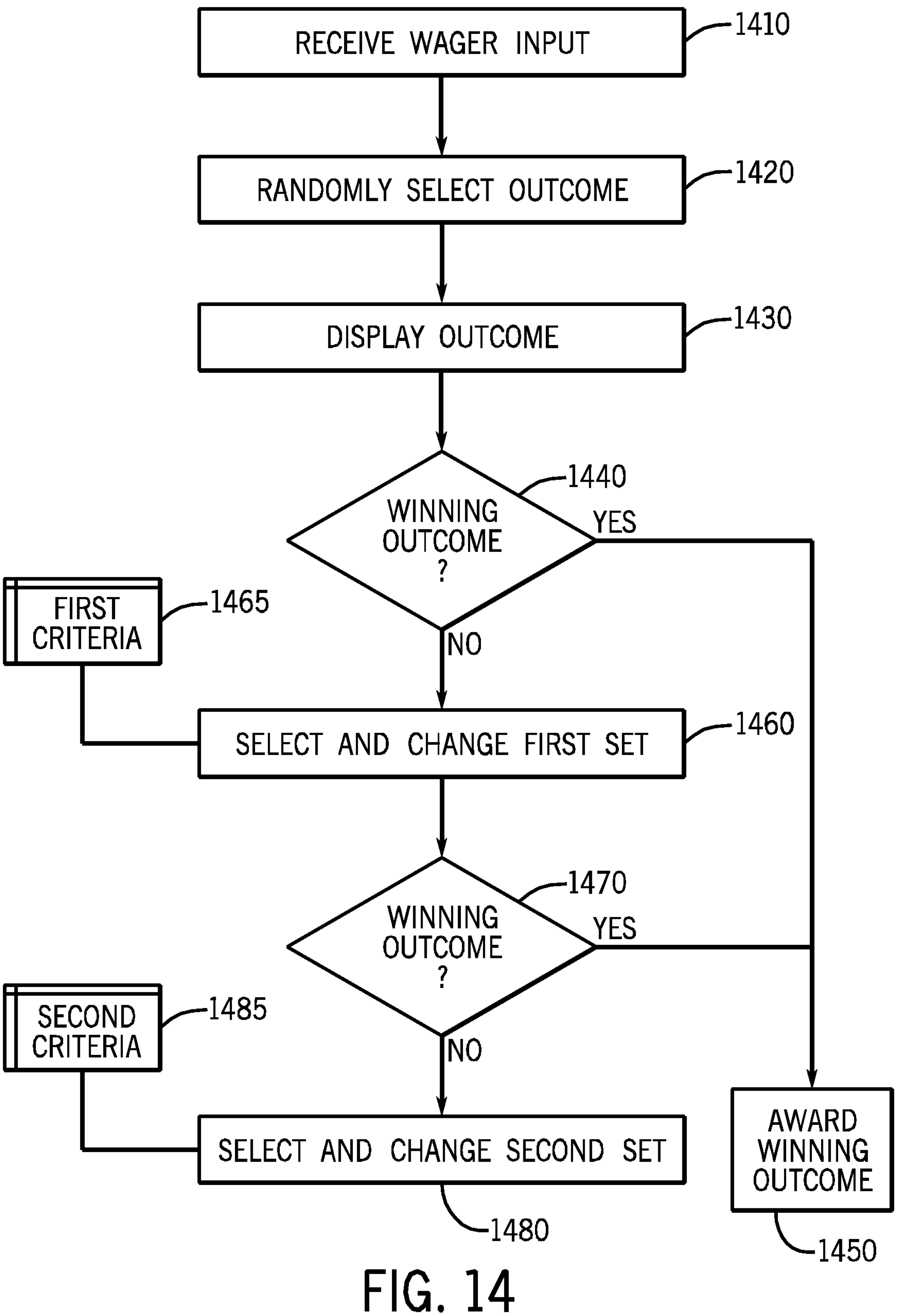
FIG. 14 is a flowchart for an algorithm that corresponds to instructions executed by one or more processors in accord with at least some aspects of the disclosed concepts.

FIG. 14, described by way of example above, represents one algorithm that corresponds to at least some instructions executed by the CPU 30 in FIG. 2 to perform the above described functions associated with the disclosed concepts. As seen in FIG. 14, a wagering is received 1410 to initiate a wagering game. The wagering game randomly selects 1420 a game outcome from a plurality of game outcomes and displays 1430 the selected game outcome to a player. The selected game outcome is evaluated 1440 for a winning outcome. In response to the game outcome including a winning outcome, the wagering game awards 1450 the player for the winning outcome. In response to the game outcome not including a winning outcome, a first set of game symbols is selected 1460 according to first criteria 1465 and changed 1460 into symbols having a higher value. The game outcome including the higher-value symbols is evaluated 1470 for a winning outcome. In response to the game outcome including a winning outcome, the player is awarded 1450 for the winning outcome. In response to the game outcome not including a winning outcome, a second set of symbols is selected 1480 according to second criteria 1485 and changed 1480 into still-higher symbols.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system primarily dedicated to playing a casino wagering game including a game outcome from a plurality of game outcomes, the plurality of game outcomes including at least one ascending-feature outcome, the gaming system comprising:

a gaming cabinet;

an electronic input device mounted to the gaming cabinet, the electronic input device configured to receive a physical input from a player to initiate the casino wagering game and transform the input into an electronic data signal;

one or more electronic display devices mounted to the gaming cabinet;

a random element generator configured to generate one or more random elements;

one or more controllers configured to:

receive a physical input indicative of a wager initiating the wagering game;

determine a game outcome of the plurality of game outcomes based, at least in part, on the one or more random elements and direct the electronic display device to display at least a portion of the game outcome as an array of game symbols;

in direct response to the game outcome being one of the at least one ascending-feature outcome, select a first set of game symbols from the array according to first criteria and modify the array by changing the selected first set into symbols having a higher value than the first set;

in direct response to the modified array resulting in at least one winning combination of symbols being displayed and prior to randomly selecting another game outcome, award a player any awards associated with the at least one winning combination; and in direct response to the modified array not resulting in a winning combination and prior to generating another one or more random elements, select a second set of displayed game symbols from the modified array according to second criteria and further modify the modified array by changing the selected second set into symbols having a higher value than the second set.

2. The gaming system of claim 1, wherein the first criteria include only the lowest value symbols in the array.

3. The gaming system of claim 2, wherein the selected first set is changed into next-higher-value symbols.

4. The gaming system of claim 3, wherein the second criteria include all of the next-higher-value symbols in the array.

5. The gaming system of claim 2, wherein the selected first set is changed into next-higher-value symbols, the second criteria include all of the next-higher-value symbols in the array, and the selected second set is changed into still-higher-value symbols.

6. The gaming system of claim 2, wherein the value of a symbol is determined by a paytable position.

7. The gaming system of claim 1, wherein the displayed portion of the one of the at least one ascending-feature outcome does not include a winning combination of symbols.

8. The gaming system of claim 1, wherein the one or more controllers are further configured to:

in direct response to the further-modified array resulting in at least one winning combination of symbols being displayed and prior to randomly selecting another game outcome, award the player any awards associated with the at least one winning outcome; and in direct response to the further-modified array not resulting in a winning combination of symbols being displayed and prior to randomly selecting another game outcome, select a third set of the displayed game symbols from the further-modified array according to third criteria, and still-further modify the further-modified array by changing the third set into symbols having a still-higher value than the third set.

9. The gaming system of claim 8, wherein the one or more controllers are further configured to:

in direct response to the still-further-modified array resulting in at least one winning combination of symbols being displayed and prior to generating another one or more random elements, award the player any awards associated with the at least one winning outcome; and in direct response to the still-further-modified array not resulting in at least one winning combination of symbols being displayed and prior to generating another one or more random elements, continue selecting subsequent sets of displayed game symbols according to respective criteria and modifying the array by changing each subsequent set of symbols into even-higher-value symbols until a winning combination is displayed, and award the player any awards associated with the at least one winning outcome.

10. The gaming system of claim 1, further comprising a gaming server connected to a communications network and communicating with the electronic input device, the electronic display device, and the one or more controllers via the communications network.

11. The gaming system of claim 10, wherein the array of game symbols is displayed on at least one remote display device via the communications network.

12. A computer-implemented method primarily dedicated to playing a casino wagering game on a gaming system including a gaming cabinet, an electronic input device, an electronic display device, a random element generator, and one or more controllers, the electronic display device and the electronic input device being mounted to the gaming cabinet, and, the wagering game including randomly selecting a game outcome from a plurality of game outcomes including at least one ascending-feature outcome; the method comprising:

generating one or more random elements with the random element generator;

receiving, responsive to a physical input to the electronic input device, an input indicative of a wager initiating the wagering game;

determining, a game outcome of the plurality of game outcomes based, at least in part, on the one or more random elements and displaying, on the electronic display device, at least a portion of the game outcome as an array of game symbols;

in direct response to the game outcome being one of the at least one ascending-feature outcome and prior to generating another one or more random elements, selecting, via the one or more controllers, at least one of a first set of game symbols from the array according to a first criteria and modifying the array by changing the at least one of the first set into a symbol having a higher value than the at least one symbol of the first set;

in direct response to the modified array resulting in at least one winning combination of symbols being displayed and prior to generating another one or more random elements, awarding a player any awards associated with the at least one winning combination; and in direct response to the modified array not resulting in a winning combination and prior to generating another one or more random elements, selecting, via the one or more controllers, at least one of a second set of the displayed game symbols from the modified array according to second criteria and further modifying the modified array by changing the at least one symbol of the second set into a symbol having a higher value than the at least one symbol of the second set.

13. The method of claim 12, wherein the first criteria include only symbols in the rightmost column of the array.

14. The method of claim 13, wherein the second criteria include only symbols in the next-to-rightmost column of the array.

15. The method of claim 13, wherein the at least one symbol of first set and the at least one symbol of the second set are changed into wild symbols.

16. The method of claim 12, wherein the displayed portion of the one of the at least one ascending-feature outcome does not include a winning combination of symbols.

17. The method of claim 12, wherein the gaming system further comprises a gaming server connected to a communications network and communicating with the electronic input device, the electronic display device, and the one or more controllers via the communications network.

18. The method of claim 17, wherein the array of game symbols is displayed on at least one remote display device via the communications network.

19. A gaming system primarily dedicated to playing a casino wagering game including randomly selecting a game outcome from a plurality of game outcomes, the gaming system comprising:

a gaming cabinet;

an electronic input device mounted to the gaming cabinet, the electronic input device configured to receive a physical input from a player to initiate the casino wagering game and transform the input into an electronic data signal;

one or more electronic display devices mounted to the gaming cabinet;

a random element generator configured to generate one or more random elements;

one or more controllers configured to:

receive, from the electronic input device, an input indicative of a first wager initiating the wagering game;

determine a game outcome of the plurality of game outcomes based, at least in part, on the one or more random elements and direct the electronic display device to display at least a portion of the game outcome as an array of game symbols;

in direct response to the displayed array including a full column of wild symbols that is not the leftmost column of the array, award the player any awards associated with the game outcome, and change the column that is left-adjacent to the full column into wild symbols for displaying in a next-subsequent game outcome;

receive, via the electronic input device, an input indicative of a second wager; and determine a next-subsequent game outcome of the plurality of game outcomes based, at least in part, on the one or more random elements and direct the electronic display device to display, on the electronic display device, at least a portion of the next-subsequent game outcome as a new array of game symbols including the left-adjacent column of wild symbols.

20. The gaming system of claim 19, wherein the one or more controllers are further configured to continue changing the column that is left-adjacent to the currently displayed full column of wild symbols for displaying in a next-subsequent game outcome, until the full column is in the leftmost column of the array.

21. The gaming system of claim 19, further comprising a gaming server connected to a communications network and communicating with the electronic input device, the electronic display device and the one or more controllers via the communications network.

22. The gaming system of claim 19, wherein the array of game is displayed on at least one remote display device via the communications network.

23. A computer-readable, non-transitory medium including executable instructions that, when executed by one or more controllers, cause a gaming system including a gaming cabinet, a random element generator, an electronic input device and an electronic display device, the electronic input device and the electronic display device being mounted to the gaming cabinet, to perform a method comprising:

receiving, via the electronic input device, an input indicative of a wagering initiating a wagering game;

generating one or more random elements with the random element generator;

determining a game outcome of a plurality of game outcomes including at least one ascending-feature outcome, the game outcome being based, at least in part, on the one or more random elements;

directing the electronic display device to display at least a portion of the selected game outcome as an array of game symbols;

in direct response to the game outcome being one of the at least one ascending-feature outcome and prior to generating another one or more random elements, select a first set of game symbols from the array according to first criteria and modify the array by changing the selected first set into symbols having a higher value than the first set;

in direct response to the modified array resulting in at least one winning combination of symbols being displayed and prior to generating another one or more random elements, award a player any awards associated with the at least one winning combination; and in direct response to the modified array not resulting in a winning combination and prior to generating another one or more random elements, select a second set of displayed game symbols from the modified array according to second criteria and further modify the modified array by changing the selected second set into symbols having a higher value than the second set.

24. The computer-readable medium of claim 23, wherein the gaming system further comprises a gaming server connected to a communications network and communicating with the electronic display device, the electronic input device, and the one or more controllers via the communications network.

25. The method of claim 24, wherein the array of game symbols is displayed on at least one remote display device via the communications network.

* * * * *